July 26, 1932.   C. S. HALL   1,868,976
AIRCRAFT PROPELLING MECHANISM
Filed April 15, 1931   2 Sheets-Sheet 1
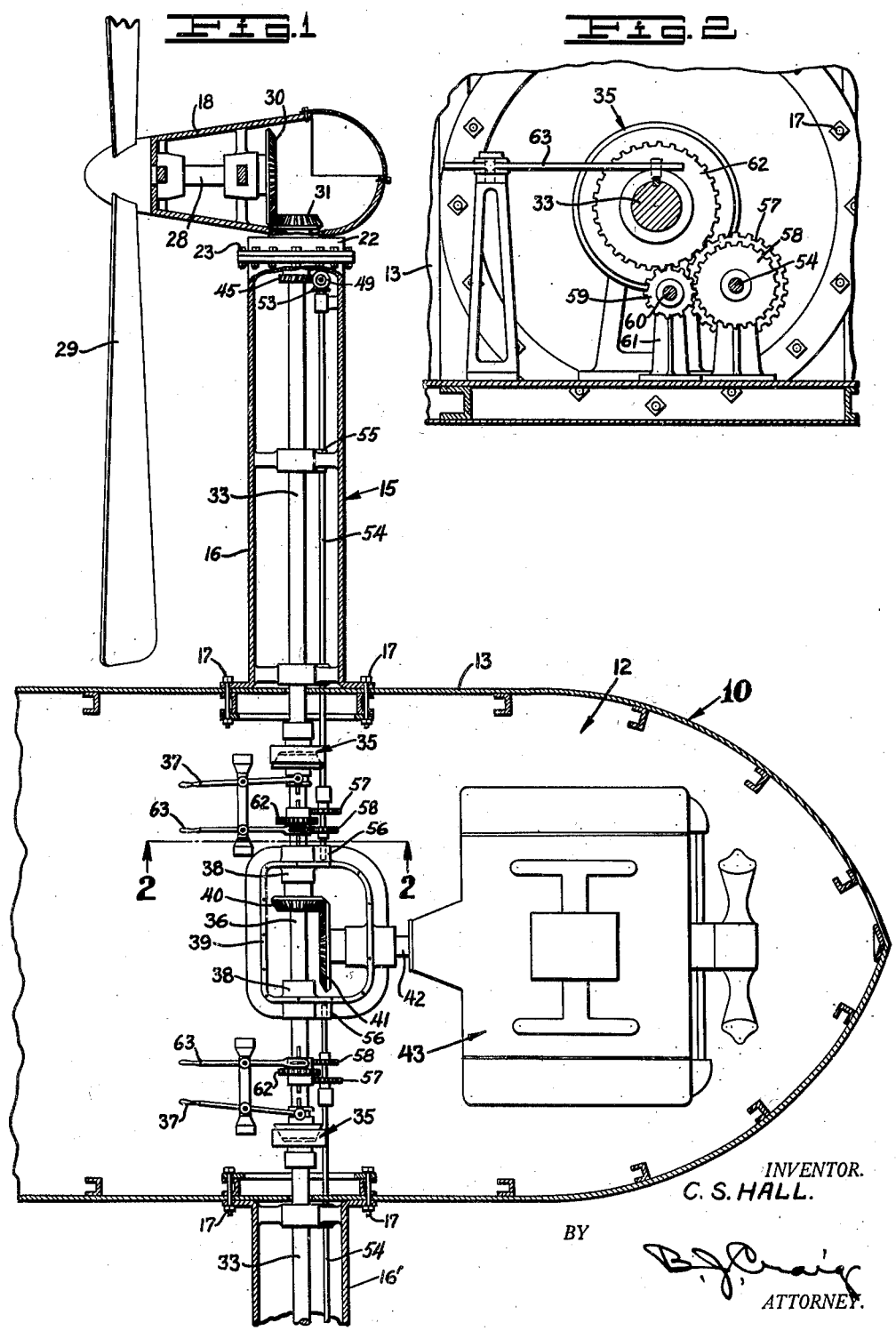

July 26, 1932.  C. S. HALL  1,868,976
AIRCRAFT PROPELLING MECHANISM
Filed April 15, 1931   2 Sheets-Sheet 2
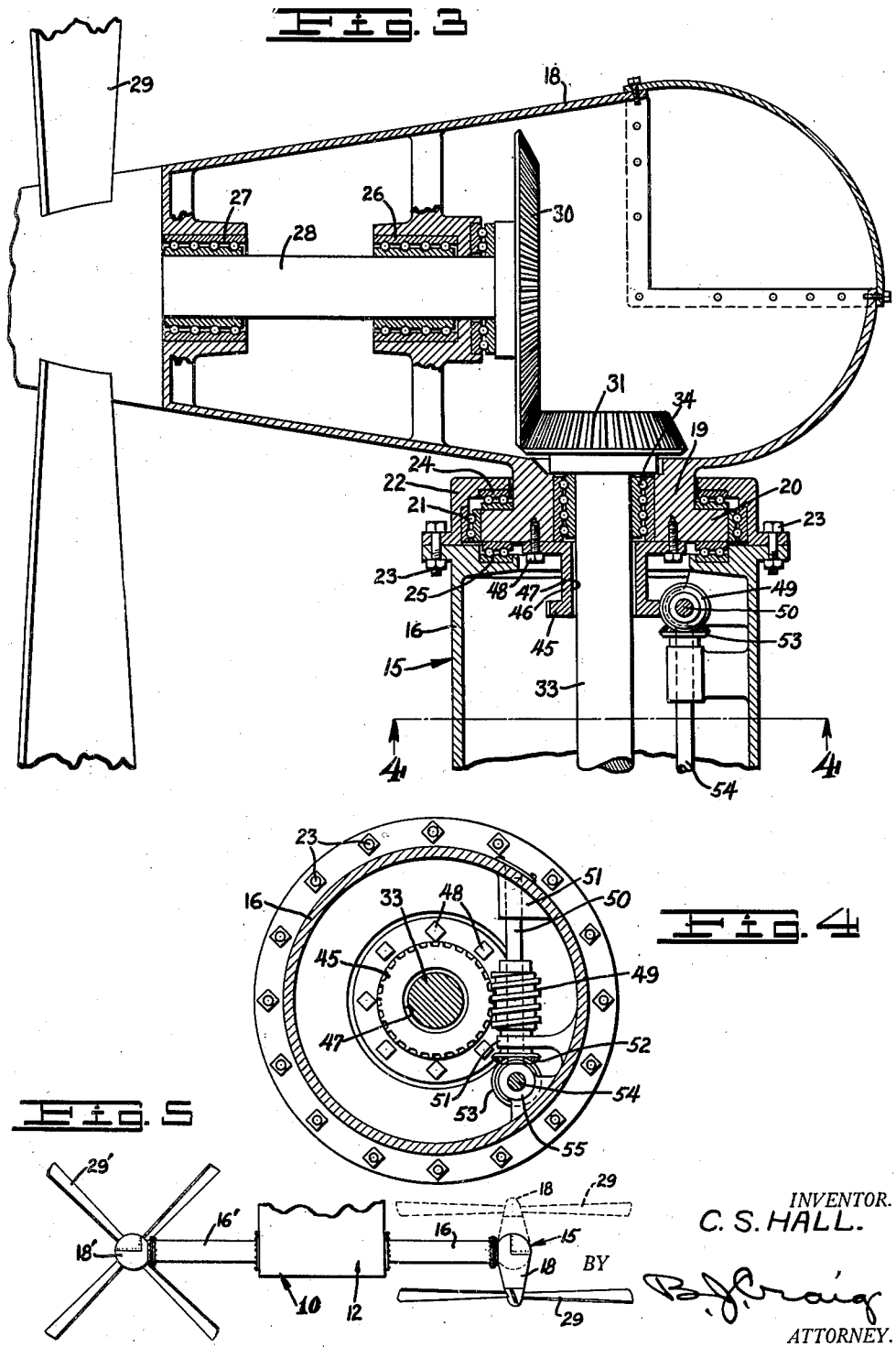
INVENTOR.
C. S. HALL.

Patented July 26, 1932

1,868,976

UNITED STATES PATENT OFFICE

CHARLES S. HALL, OF LOS ANGELES, CALIFORNIA

AIRCRAFT PROPELLING MECHANISM

Application filed April 15, 1931. Serial No. 530,365.

This invention relates to improvements in aircraft propelling mechanisms.

The general object of my invention is to provide an improved aircraft propelling device wherein the propeller is mounted in a novel manner so that it may be moved to various positions to produce a thrust effect in various directions.

Another object of the invention is to provide an improved rotatable support for a propeller which is adapted to be rotated by the propeller driving means.

A further object of the invention is to provide a novel drive means for rotating the propeller support in either direction and for locking the housing in the position to which it has been moved.

Other objects and advantages of this invention will be apparent from the following description taken in connection with the accompanying drawings wherein:

Fig. 1 is a top plan section through a portion of an aircraft showing my improved propeller drive mechanism operatively positioned thereon.

Fig. 2 is an enlarged section taken on line 2—2 of Fig. 1.

Fig. 3 is an enlarged central plan section through a portion of the propeller support.

Fig. 4 is a section taken on line 4—4 of Fig. 3, and

Fig. 5 is a diagrammatic view of a portion of an aircraft showing my invention applied thereto.

Referring to the drawings by reference characters I have shown my invention as applied to an aircraft indicated generally at 10. This aircraft may be of any suitable type such as a heavier than air aircraft or a lighter-than-air aircraft and includes a cabin 12 having side walls 13.

As shown I provide propeller supports 15 which are mounted in alignment on opposite sides of the cabin 12. Each of the supports 15 includes a hollow housing 16 which is secured to the side walls 13 of the cabin by a plurality of bolts 17. Mounted on the outer end of the housing 16 I provide a hollow casing 18 which includes a hub 19 having an enlarged flange 20 thereon. The flange 20 is journaled in a anti-friction bearing 21 which is mounted in a cap 22 secured to the housing 16 by a plurality of bolts and nuts 23. The flange 20 is further positioned between an anti-friction bearing 24 which is carried by the cap 22 and an anti-friction bearing 25 which is carried by the housing 16.

Positioned in anti-friction bearings 26 and 27 in the casing 18 I provide a shaft 28 which extends out of the casing at one end and has an aircraft propeller 29 secured thereto. Secured to the opposite end of the shaft 28 I provide a bevel gear 30 which engages a bevel gear 31. Both bevel gears are within the casing 18. The bevel gear 31 is secured to a drive shaft 33 which is positioned in an anti-friction bearing 34 in the hub 19 of the casing and extends through the housing 16 into the cabin 12 where it has secured thereto one portion of a clutch mechanism 35. The other portion of the clutch mechanism is mounted on a shaft 36 and is shown as being movable into and out of engagement with the portion on the shaft 33 by means of a shifting lever 37.

As shown the shaft 36 is supported in bearings 38 on a housing 39 and has secured thereto within the housing 39 a bevel gear 40 which meshes with another bevel gear 41 secured to the drive shaft 42 of a prime mover which is shown as an internal combustion engine 43.

From the foregoing description it will be apparent that when the engine 43 is operating and the portions of the clutch 35 are in engagement the engine drive shaft 42 will drive the shaft 36 through the medium of the bevel gears 40 and 41 which will in turn drive the shaft 33 through the medium of the clutch mechanism 35. When the shaft 33 is thus rotated it will rotate the shaft 28 through the medium of the bevel gears 30 and 31 and thereby rotate the propeller 29.

A housing 16' is arranged opposite the housing 16. The housing 16' has a casing 18' thereon and includes a propeller 29'. The housing 16' and associated parts are identical with the housing 16 and both propellers are driven from the shaft 36.

For rotating the casing 18 I provide a worm gear 45 which includes a hub 46 having an aperture 47 therein through which the shaft 33 extends and which is secured to the hub 19 of the casing by a plurality of bolts 48 as clearly shown in Fig. 3.

The worm gear 45 meshes with a worm pinion 49 which is secured to a shaft 50 journaled in bearings 51 in the housing 16 (see Fig. 4). Secured to the shaft 50 I provide a bevel gear 52 which meshes with another bevel gear 53 secured to a shaft 54 which is supported in bearings 55 in the housing 16 and extends into the cabin 12 where it is journaled in a bearing 56 on the housing 39. Secured to the shaft 54 adjacent the housing 39 I provide a pair of spaced gears 57 and 58 and meshing with the gear 58 I provide a gear 59 which is secured to a shaft 60 mounted in bearings 61 (see Fig. 2).

Slidably mounted on the shaft 36 intermediate the gears 57 and 58 I provide a gear 62 which is adapted to be rotated by the drive shaft 36 and is shown as adapted to be moved into and out of mesh with the gears 57 and 59 by a lever 63.

When the shaft 36 is being rotated by the engine 43 and the gear 62 is moved into mesh with the gear 57 and shaft 54 will be rotated which, through the medium of the bevel gears 52 and 53, will rotate the shaft 50 thereby rotating the worm pinion 49 which in turn rotates the worm gear 45 to thereby cause the casing 18 to swing around the axis of the drive shaft 33.

When the gear 62 is moved into mesh with the gear 52 the shaft 54 will be rotated in a direction opposite to that in which it is rotated when the gear 62 meshes with the gear 57.

When the gear 62 is moved out of mesh with either the gears 57 or 59 the worm gear 45 and the worm pinion 49 will lock and prevent the weight of the casing 18 and its associated parts from altering the position of the casing from the position to which it has been moved.

From the foregoing description it will be apparent that I have provided a novel propeller drive mechanism and support which is simple in constructon and highly efficient in operation.

Having thus described my invention, I claim:

1. In an aircraft including a body portion, a hollow housing secured to said body, a casing rotatably mounted on said housing, a propeller supported by said casing, a prime mover, means to drive said propeller from said prime mover, a worm gear secured to said casing and extending into said housing, a shaft journaled in said housing, a worm pinion secured thereto and meshing with said worm gear and means to drive said shaft.

2. In an aircraft including a body portion, a hollow housing secured to said body, a casing rotatably mounted on said housing, a propeller supported by said casing, a prime mover, means to drive said propeller from said prime mover, a worm gear secured to said casing and extending into said housing, a shaft journaled in said housing, a worm pinion secured to said shaft and meshing with said worm gear and selective means to rotate said shaft in either direction from said propeller drive means.

3. In an aircraft, a body, a housing on said body, spaced flanges mounted on said housing, thrust and radial bearings between said flanges, a casing engaging said bearings, a drive shaft mounted in said housing, a propeller shiftable on said housing, means for driving said propeller from said drive shaft and worm gear means to shift said propeller in either direction.

4. In an aircraft, a body, a propeller support on said body, a shiftable casing, thrust and radial bearings on said support for said casing, said casing and said propeller support having aligned bearings thereon, a drive shaft mounted on one of said aligned bearings, a bevel gear mounted on the other of said aligned bearings, a propeller shaft in said casing, means independent of said bearings for driving said propeller shaft from said drive shaft and means, including a worm gear, for shifting said casing.

5. In an aircraft including a body portion, a hollow housing secured to said body, a casing rotatably mounted on said housing, a propeller supported by said casing, a prime mover, means to drive said propeller from said prime mover, a worm gear secured to said casing and extending into said housing, a shaft journaled in said housing, a worm pinion secured thereto and meshing with said worm gear, a second shaft journaled in said housing, gear means connecting said first and second shafts, a pair of spaced gears secured to said second shaft, a shiftable gear associated with said propeller drive means, an idler gear, means to support said idler gear, said shiftable gear being movable into mesh with said idler gear and one of said spaced gears and the other of said spaced gears meshing with said idler gear.

6. In an aircraft including a body portion, a hollow housing secured to said body, a casing rotatably mounted on said housing, a shaft journaled in said casing, a propeller secured to said shaft, a drive shaft journaled in said housing, gear means connecting said propeller shaft and said drive shaft, a third shaft, means to support said third shaft, clutch means adapted to releasably connect said drive shaft and said third shaft, a prime mover including a crank shaft, gear means connecting said third shaft and said crank shaft, a worm gear in said housing, a worm pinion secured thereto and meshing with said worm gear, a worm pinion shaft journaled in said housing, a pair of spaced gears secured to said worm pinion shaft, a shiftable gear driven by said prime mover, an idler gear, means to support said idler gear, said shiftable gear being movable into mesh with said idler gear and one of said spaced gears, the other of said spaced gears meshing with said idler gear.

In testimony whereof, I hereunto affix my signature.

CHARLES S. HALL.